(12) United States Patent
Shibata et al.

(10) Patent No.: US 11,014,214 B2
(45) Date of Patent: May 25, 2021

(54) WORKING MACHINE

(71) Applicant: MAKITA CORPORATION, Anjo (JP)

(72) Inventors: Yoshinori Shibata, Anjo (JP); Ryo Imuta, Anjo (JP); Hideharu Muto, Anjo (JP)

(73) Assignee: MAKITA CORPORATION, Anjo (JP)

(*) Notice: Subject to any disclaimer, the term of this patent is extended or adjusted under 35 U.S.C. 154(b) by 107 days.

(21) Appl. No.: 16/330,035

(22) PCT Filed: Aug. 25, 2017

(86) PCT No.: PCT/JP2017/030537
§ 371 (c)(1),
(2) Date: Mar. 1, 2019

(87) PCT Pub. No.: WO2018/043330
PCT Pub. Date: Mar. 8, 2018

(65) Prior Publication Data
US 2019/0202046 A1    Jul. 4, 2019

(30) Foreign Application Priority Data

Sep. 2, 2016 (JP) .............................. JP2016-172029

(51) Int. Cl.
B24B 23/02 (2006.01)
B25F 5/02 (2006.01)
(Continued)

(52) U.S. Cl.
CPC ............... *B24B 23/02* (2013.01); *B25F 5/02* (2013.01); *B23D 45/16* (2013.01); *B23D 47/00* (2013.01);
(Continued)

(58) Field of Classification Search
CPC ........ B27G 19/02; B27G 19/04; B24B 23/02; B27B 9/00; B23D 47/00
See application file for complete search history.

(56) References Cited

U.S. PATENT DOCUMENTS 3,787,973 A    1/1974 Beisch et al.
4,672,746 A *  6/1987 Zeilenga ................ B27G 19/04
                                              30/391
(Continued)

FOREIGN PATENT DOCUMENTS

CH              386676 A  *  1/1965  ............. B27G 19/04
DE     202014104662 U1  * 10/2014  ............. B27G 19/04
(Continued)

OTHER PUBLICATIONS

Nov. 14, 2017 International Search Report issued in International Patent Application PCT/JP2017/030537.
(Continued)

*Primary Examiner* — Jennifer S Matthews
(74) *Attorney, Agent, or Firm* — Oliff PLC

(57) ABSTRACT

A working machine includes: an output shaft to which a tip tool is attachable; a housing rotatably supporting the output shaft; and a protection cover attached to the housing so as to cover an outer periphery of the tip tool which is attached to the output shaft. The protection cover is configured to be displaceable between a processing position to expose a part of the outer periphery of the tip tool to thereby allow cutting of a workpiece, and a protecting position to cover the outer periphery of the tip tool more than in the processing position, and is biased by a biasing member to be displaced from the processing position to the protecting position.

9 Claims, 14 Drawing Sheets

(51) Int. Cl.
  *B23D 45/16* (2006.01)
  *B27G 19/04* (2006.01)
  *B23D 47/00* (2006.01)
  *B27B 9/00* (2006.01)
  *B24B 55/05* (2006.01)

(52) U.S. Cl.
  CPC .............. *B24B 55/052* (2013.01); *B27B 9/00* (2013.01); *B27G 19/04* (2013.01)

(56) References Cited

U.S. PATENT DOCUMENTS

| | | | |
|---|---|---|---|
| 6,699,114 B1 | 3/2004 | Booeshaghi et al. | |
| 7,089,671 B2 * | 8/2006 | Haneda | B27B 9/00 30/374 |

FOREIGN PATENT DOCUMENTS

| | | | | |
|---|---|---|---|---|
| GB | 662756 A | * | 12/1951 | ............. B27G 19/02 |
| JP | S49-089299 A | | 8/1974 | |
| JP | S59-176501 U | | 11/1984 | |
| JP | 2002-283134 A | | 10/2002 | |
| JP | 2010-029986 A | | 2/2010 | |
| JP | 2013-078823 A | | 5/2013 | |
| JP | 2015-037819 A | | 2/2015 | |
| KR | 2015099624 A | * | 9/2015 | |

OTHER PUBLICATIONS

Apr. 29, 2020 Office Action issued in Chinese Patent Application No. 201780053938.1.
Apr. 21, 2020 Notice of Reason(s) for Rejection issued in Japanese Patent Application No. 2016-172029.
Mar. 5, 2019 International Preliminary Report on Patentability issued in International Patent Application No. PCTJP2017/030537.
Dec. 8, 2020 Office Action issued in Japanese Patent Application No. 2016-172029.

* cited by examiner

WORKING MACHINE

CROSS-REFERENCE TO RELATED APPLICATION

This international application claims the benefit of Japanese Patent Application No. 2016-172029 filed on Sep. 2, 2016 with the Japan Patent Office, and the entire disclosure of Japanese Patent Application No. 2016-172029 is incorporated herein by reference.

TECHNICAL FIELD

The present disclosure relates to a working machine capable of cutting a workpiece by a tip tool attached to an output shaft.

BACKGROUND ART

Working machines of this type include, for example, a known grinder provided with, as an output shaft, a spindle rotationally driven by a driving device, and capable of cutting a workpiece by attaching a tip tool to cut the workpiece to a top end of the spindle.

The grinder includes a housing that rotatably supports the spindle in a state where the top end of the spindle extends from the housing, and a protection cover covering an outer periphery of the tip tool is provided to the housing corresponding to an extending portion of the spindle (see, for example, Patent Document 1).

In order to allow processing (cutting, grinding, polishing, etc.) of the workpiece by rotation of the tip tool attached to the spindle, the protection has a shape (usually, a semicircular shape) covering a part of the outer periphery of the tip tool and exposing the tip tool in a processing area of the workpiece.

PRIOR ART DOCUMENTS

Patent Documents

Patent Document 1: Japanese Unexamined Patent Application Publication No. 2013-78823

SUMMARY OF THE INVENTION

Problems to be Solved by the Invention

When a user holds the aforementioned working machine by hand and cuts a workpiece, the tip tool is rotated and brought into abutment with a cutting position of the workpiece. At this time, the working machine is sometimes kicked back from the workpiece (hereinafter also referred to as "kickback") due to a reaction force applied from the workpiece to the tip tool.

In this case, the working machine moves against the user's intention; thus, the tip tool may hit a position of the workpiece different from a processing position or a surrounding member, thereby damaging these portions or breaking the tip tool itself.

In one aspect of the present disclosure, it is preferable to configure a working machine that is capable of cutting a workpiece by rotating a tip tool so as to automatically cover an outer periphery of the tip tool exposed from a protection cover when being kicked back due to a reaction force applied from the workpiece during cutting.

Means for Solving the Problems

A working machine in one aspect of the present disclosure includes: an output shaft to which a tip tool to cut a workpiece is attachable; a housing rotatably supporting the output shaft; and a protection cover attached to the housing so as to cover an outer periphery of the tip tool that is attached to the output shaft.

The protection cover is configured to be displaceable between a processing position to expose a part of the outer periphery of the tip tool to thereby allow cutting of the workpiece, and a protecting position to cover the outer periphery of the tip tool more than in the processing position. Also, the protection cover is biased by a biasing member to be displaced from the processing position to the protecting position.

Thus, according to the working machine of the present disclosure, during cutting of a workpiece, the protection cover is brought into abutment with, for example, the workpiece or a surrounding member, to thereby displace the protection cover from the protecting position to the processing position against a biasing force of the biasing member, thus allowing cutting of the workpiece.

During cutting of a workpiece, if the working machine is kicked back from the workpiece (at occurrence of kickback) due to a reaction force applied from the workpiece to the tip tool, the protection cover is displaced from the processing position to the protecting position by the biasing force of the biasing member.

As a result, at occurrence of kickback, the outer periphery of the tip tool exposed from the protection cover during cutting of the workpiece is automatically covered with the protection cover. Accordingly, the working machine of the present disclosure enables reduction in hitting of the workpiece or the surrounding member by the tip tool, and in resulting damage of these portions or breakage of the tip tool at occurrence of kickback.

The working machine in one aspect of the present disclosure may include a movable member configured to move from an initial position in response to an attitude change of the working machine caused by a reaction force applied from the workpiece to the tip tool during cutting of the workpiece, and an engaging member.

Also, the engaging member may be configured to engage with the protection cover and hold the protection cover in the processing position while the movable member is in the initial position, and to disengage from the protection cover and cause the biasing member to displace the protection cover to the protecting position in response to a movement of the movable member from the initial position.

According to the working machine configured as described above, at occurrence of kickback, the movable member moves from the initial position, the engaging member disengages with the protection cover, and the protection cover is displaced from the processing position to the protecting position.

While the movable member is in the initial position, the engaging member engages with the protection cover and holds the protection cover in the processing position; thus, during cutting of the workpiece, the protection cover can be arranged in the processing position without abutment of the protection cover to the workpiece or a surrounding member.

The movable member may include a weight configured to move from the initial position in response to a movement of the working machine in a specified direction at an acceleration equal to or greater than a specified value.

Also, the protection cover may include a cover main body to cover the tip tool so as to expose a part of the outer periphery of the tip tool, and an auxiliary cover to cover the outer periphery of the tip tool exposed from the cover main body. In this case, the biasing member may be configured to bias the auxiliary cover so as to cause the auxiliary cover to cover the outer periphery of the tip tool in the protecting position.

This allows cutting of a workpiece by displacing the auxiliary cover from the protecting position to the processing position, and allows the auxiliary cover to be automatically moved to the protecting position at occurrence of kickback by the biasing force of the biasing member.

Also in this case, the auxiliary cover may be provided pivotably about the output shaft, and the biasing member may be configured to bias the auxiliary cover about the output shaft such that the auxiliary cover covers the outer periphery of the tip tool in the protecting position.

Further, the auxiliary cover may be provided pivotably about a pivot shaft, which is different from the output shaft, and the biasing member may be configured to bias the auxiliary cover about the pivot shaft such that the auxiliary cover covers the outer periphery of the tip tool in the protecting position.

In this case, when the auxiliary cover is provided to the cover main body, the auxiliary cover pivots about the pivot shaft provided to the cover main body, thereby being displaced between the protecting position and the processing position. Thus, a protection cover displaceable between the protecting position and the processing position may be configured very easily using hinges, or the like.

When the auxiliary cover is provided to the cover main body, the pivot shaft may be provided to an outer frame portion of the cover main body surrounding an outer peripheral edge of the tip tool so as to be parallel to the output shaft.

In this case, since the auxiliary cover is biased by the biasing member in a direction of departing from the cover main body, at least one of the cover main body or the auxiliary cover may include a restricting portion to restrict a pivot region in which the auxiliary cover is pivotable about the pivot shaft.

EXPLANATION OF REFERENCE NUMERALS

2 . . . grinder; 4 . . . motor housing; 5 . . . operation switch; 6 . . . gear housing; 10 . . . tip tool; 12 . . . spindle; 18 . . . bevel gear; 20 . . . inner housing; 22 . . . inner flange; 24 . . . locknut; 30, 30A, 30B, 30C . . . protection cover; 32 . . . cover main body; 34, 34A, 34B, 34C . . . auxiliary cover; 35 . . . projection; 36 . . . attachment portion; 38 . . . fastening member; 42 . . . gap; 44 . . . sliding member; 46 . . . tension spring; 48 . . . arm; 50 . . . movable member; 52 . . . weight; 60 . . . engaging member; 62 . . . support shaft; 64 . . . claw; 71, 72 . . . hinge; 73, 74 . . . torsion spring; 75, 76 . . . support portion; 78 . . . roller; 82 . . . support piece; 84 . . . pivot shaft; 33, 88 . . . restricting portion.

MODE FOR CARRYING OUT THE INVENTION

Hereinafter, some embodiments of the present disclosure will be described with reference to the drawings.

Embodiment 1

Figure 1:
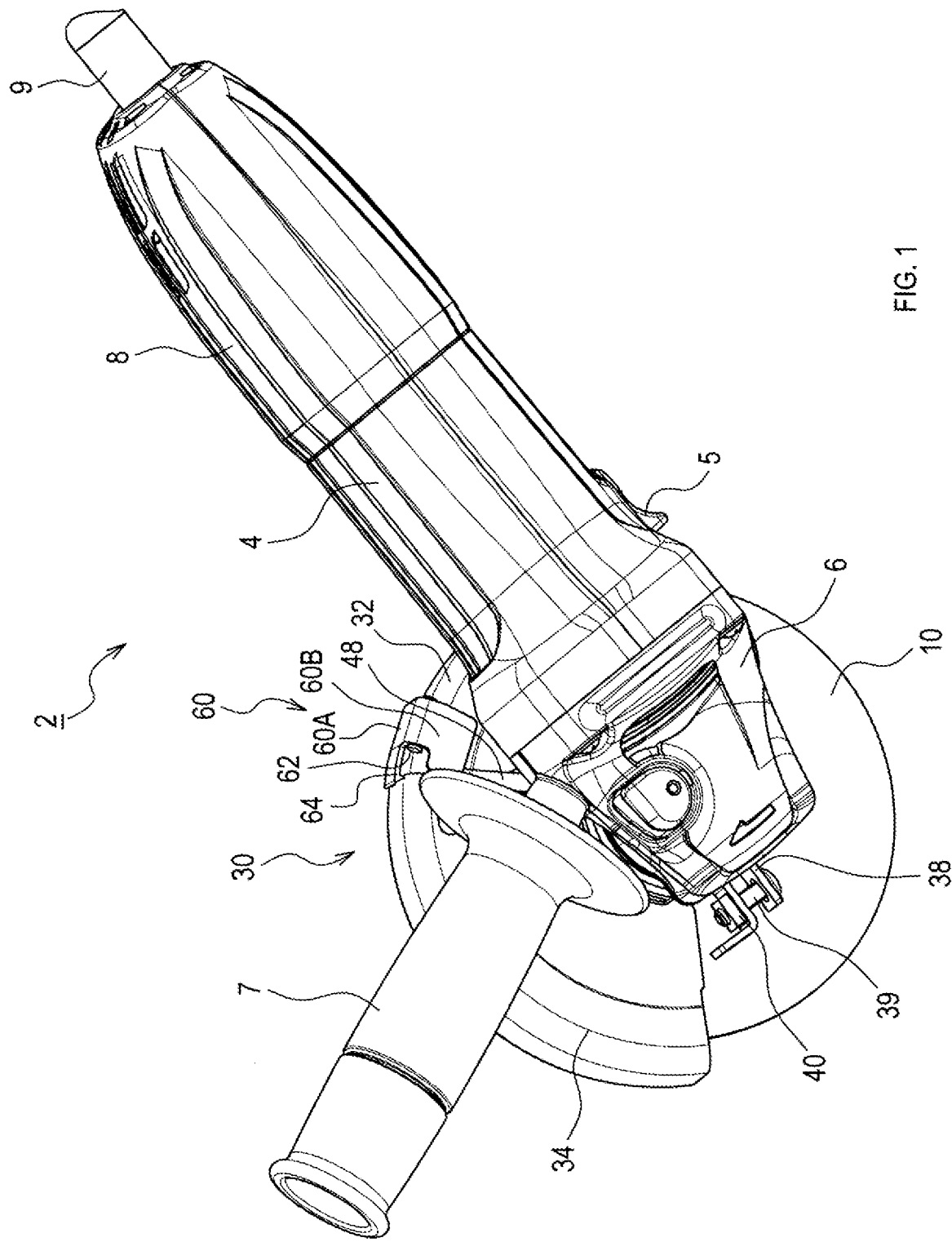
FIG. 1 is a perspective view showing an entire configuration of a grinder in a first embodiment.

As shown in FIG. 1, a grinder 2 of the present embodiment includes a motor housing 4, a gear housing 6, a rear cover 8, and a protection cover 30.

The motor housing 4 is a substantially cylindrical shaped housing and houses a motor. The motor is housed in the motor housing 4 to have a rotation shaft that is consistent with or parallel to a central axis of the motor housing 4, and a top end of the rotation shaft of the motor extends toward the gear housing 6.

The rear cover 8 is provided at one end of the motor housing 4 along a center axial direction, and houses a control circuit to drive-control the motor. The control circuit is configured to receive electric power supply from an external power source through a power cord 9 to thereby drive-control the motor.

Figure 2:
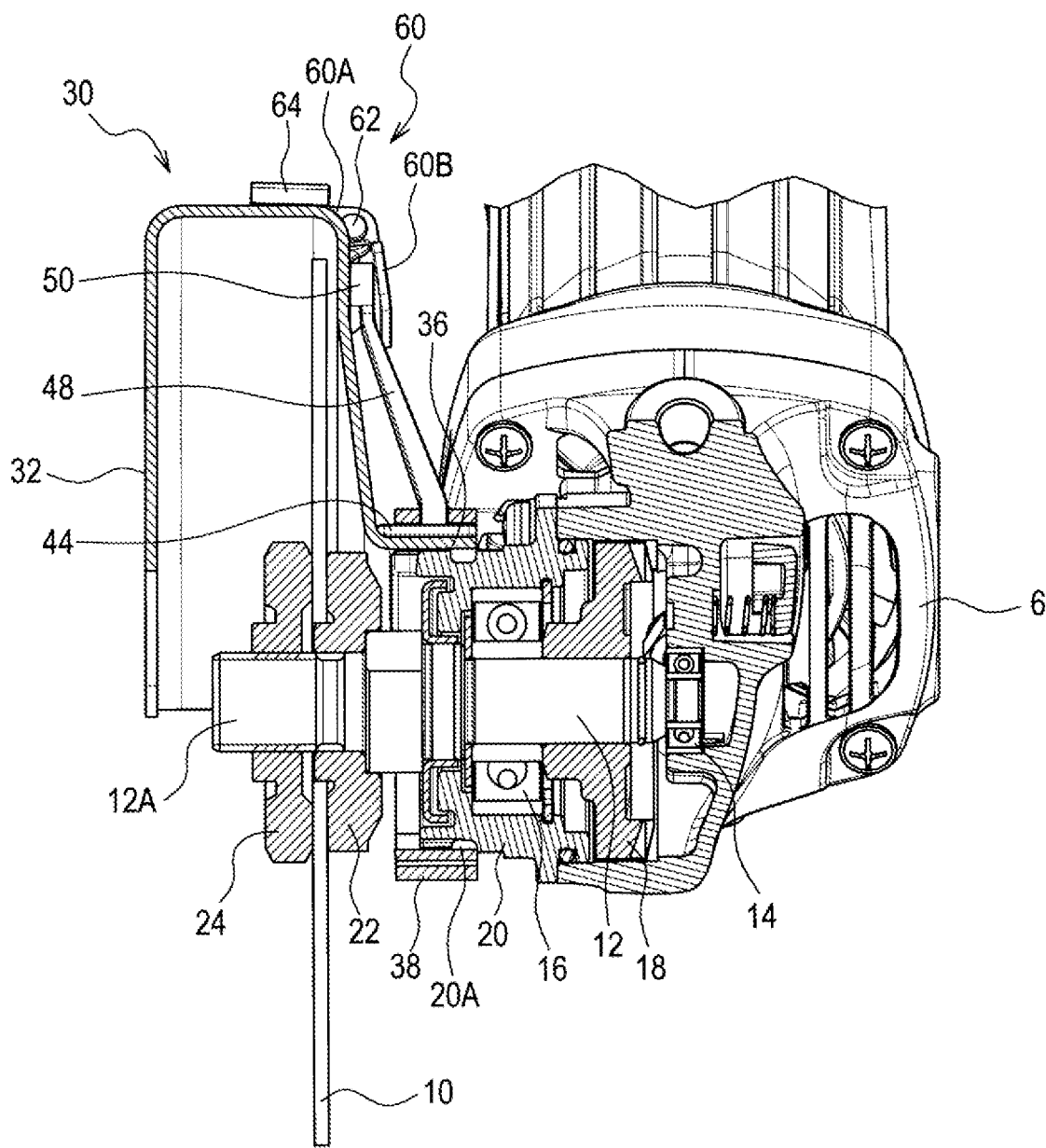
FIG. 2 is a sectional view showing surroundings of a gear housing while an auxiliary cover is in a processing position.

The gear housing 6 is provided on an opposite side of the motor housing 4 relative to the rear cover 8, and houses a spindle 12 as an output shaft, as shown in FIG. 2. A handle 7 for gripping by a user is provided to the gear housing 6.

The spindle 12 is provided rotatably in the gear housing 6 through bearings 14, 16 and an inner housing 20. Also, the spindle 12 is arranged such that its central axis is substantially orthogonal to the rotation shaft of the motor. The spindle 12 is provided with a bevel gear 18 that engages with a bevel gear provided to the rotation shaft of the motor, thereby converting a rotation of the motor into a rotation of the spindle 12.

One end of the spindle 12 extends outward from an inner housing 20 (in other words, the gear housing 6), and an inner flange 22 to position and fix a disk-shaped tip tool 10 is provided to the extending portion.

Also, a screw portion 12A to screw a locknut 24 is formed at an outer circumference of a more outward end of the spindle 12 than the inner flange 22. The locknut 24 is a member to hold the tip tool 10 between the inner flange 22 and the locknut 24.

In the grinder 2 configured as described above, when an operation switch 5 (see FIG. 1) provided at a side wall of the motor housing 4 is turned on, the motor is driven by a control circuit inside the rear cover 8, and a rotation output of the motor is transmitted to the spindle 12.

Thus, once the tip tool 10 is fixed to the spindle through the locknut 24, the tip tool 10 is allowed to rotate and perform operations, such as grinding, polishing, and cutting. Examples of the tip tool 10 to be used in the grinder 2 in this manner may include a grinding stone, a cutting blade, and a wire brush.

The protection cover 30 is a member to protect a user from dust or the like scattering from a workpiece during an operation, such as grinding, polishing, and cutting. For this purpose, the protection cover 30 includes a semicircular shaped cover main body 32 that is configured to cover a part of (more specifically, approximately a half of) an outer periphery of the tip tool 10 fixed to the spindle 12.

The protection cover 30 shown in FIG. 2 is a member to be used during cutting of a workpiece, and the cover main body 32 has a U-shaped section so as to cover the tip tool 10, including an edge of the outer periphery, from both sides thereof.

The cover main body 32 is fixed to a region of the inner housing 20 from which the spindle 12 extends.

Figure 3:
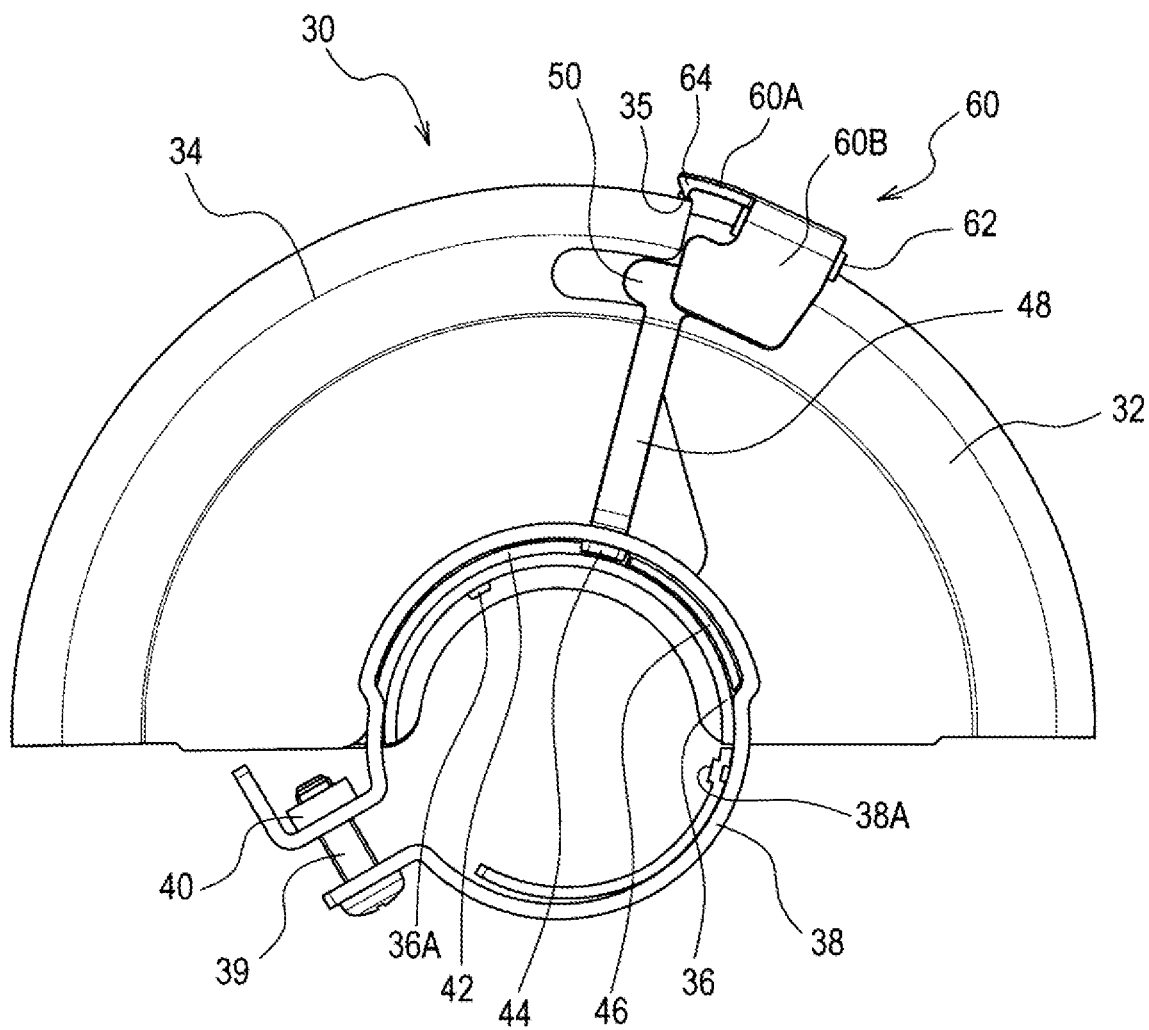
FIG. 3 is a plan view showing a protection cover while the auxiliary cover is in the processing position.

Specifically, an attachment region of the inner housing 20, to which the protection cover 30 is attached, has a cylindrical shape that is coaxial with the central axis of the spindle 12 and surrounds the spindle 12. As shown in FIG. 3, the cover main body 32 includes a semicircular shaped attachment portion 36 so as to surround the attachment region.

Also, around the attachment portion 36 of the cover main body 32 is provided a ring-shaped fastening member 38. The ring-shape of the fastening member 38 is partly open, and open ends thereof are coupled by a male screw 39 and a nut 40.

Thus, by fastening the open ends with the male screw 39 and the nut 40, the fastening member 38 is enabled to hold the attachment portion 36 of the cover main body 32 with the attachment region of the inner housing 20, thereby enabling fixation of the cover main body 32 to the inner housing 20 (and thus to the gear housing 6).

An inner circumferential surface of the attachment portion 36 of the cover main body 32 and an inner circumferential surface of the fastening member 38 include projections 36A and 38A, respectively, configured to engage with a groove 20A formed in an outer circumferential surface of the attachment region of the inner housing 20, to thereby inhibit movement of the cover main body 32 along an axial direction of the spindle 12.

The cover main body 32 is provided with an auxiliary cover 34 to cover an open area of the tip tool 10 in other words, a processing area of a workpiece) that cannot be covered with the cover main body 32.

Figure 4:
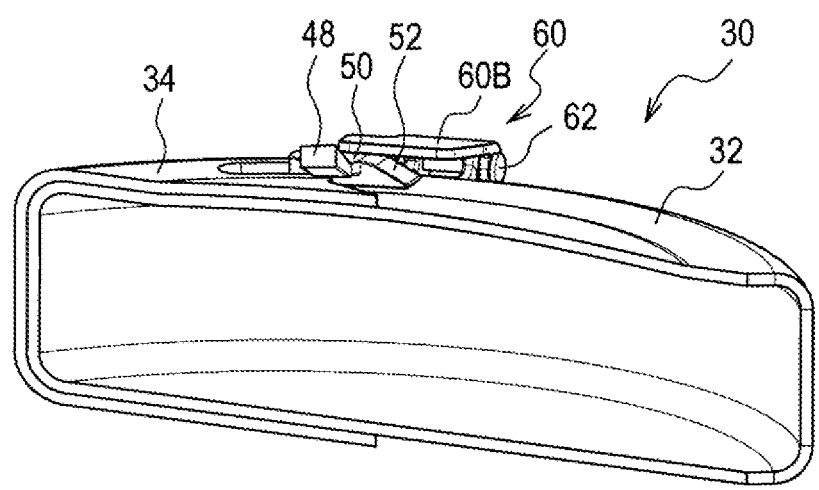
FIG. 4 is a perspective view showing configurations of a movable member and an engaging member provided in the protection cover.

The auxiliary cover 34 has a U-shaped section so as to externally cover the cover main body 32 and to be capable of moving along an outer periphery of the cover main body 32 about the spindle 12 (see FIG. 4).

During processing of a workpiece, as shown in FIG. 3, the auxiliary cover 34 is positioned in a processing position where a projection 35 provided at one end of an outer peripheral edge of the auxiliary cover 34 is engaged with a claw 64 of an engaging member 60 fixed to the cover main body 32, such that the auxiliary cover 34 entirely overlaps the cover main body 32.

As shown in FIG. 2, the engaging member 60 has an L-shaped section formed by a piece 60A, which is substantially parallel to an outer peripheral edge of the cover main body 32 and includes the claw 64, and by a piece 60B, which is arranged substantially parallel to a plate surface of the tip tool 10. The engaging member 60 is fixed to the cover main body 32 by fixing its corner as a coupling portion between the piece 60A and the piece 60B to a support shaft 62 provided to the cover main body 32.

As shown in FIG. 3 and FIG. 4, the support shaft 62 is arranged along the outer peripheral edge of the cover main body 32, and the engaging member 60 is pivotable about the support shaft 62. The engaging member 60 is biased by a spring provided to the support shaft 62 in such a direction that the claw 64 departs from the outer peripheral edge of the cover main body 32.

While the auxiliary cover 34 is in the processing position, a weight 52 (see FIG. 4) configuring a movable member 50 is arranged between the piece 60B of the engaging member 60 and the cover main body 32, and the weight 52 maintains an engaged state between the claw 64 of the engaging member 60 and the projection 35 of the auxiliary cover 34.

The movable member 50 is positioned in an initial position to retain the auxiliary cover 34 in the processing position by a specific static friction force that is generated by the weight 52 being caught between the cover main body 32 and the piece 60B of the engaging member 60. When an acceleration greater than the static friction force is applied to the weight 52, the movable member 50 moves from the initial position.

When the movable member 50 (in other words, the weight 52) moves from the initial position, an engagement between the claw 64 of the engaging member 60 and the projection 35 of the auxiliary cover 34 is released, and the auxiliary cover 34 is allowed to be displaced along the outer peripheral edge of the cover main body 32 about the spindle 12. That is, the auxiliary cover 34 is allowed to be displaced from the processing position where the auxiliary cover 34 overlaps the cover main body 32 toward a protecting position where the auxiliary cover 34 partially extends from the cover main body 32 to cover the tip tool 10.

The movable member 50 is coupled, through an arm 48 extending in a radial direction of the cover main body 32, to a sliding member 44 slidably provided in a gap 42 between the attachment portion 36 of the cover main body 32 and the fastening member 38.

The sliding member 44 is biased by a tension spring 46 provided in the gap 42 in a direction such that the movable member 50 is displaced opposite to the engaging member 60. Also, when the movable member 50 is displaced opposite to the engaging member 60, the auxiliary cover 34 is abutted by an opposite side of the movable member 50 relative to the engaging member 60, and is displaced together with the movable member 50.

According to the grinder 2 of the present embodiment with such configuration, when cutting a workpiece with the tip tool 10 for cutting, a user first moves the auxiliary cover 34 in a direction to overlap the cover main body 32 by acting against the biasing force of the tension spring 46.

As a result, the movable member 50 enters between the cover main body 32 and the piece 60B of the engaging member 60, and the projection 35 of the auxiliary cover 34 engages with the claw 64 of the engaging member 60, thereby allowing the auxiliary cover 34 to be arranged in the processing position where cutting of the workpiece with the tip tool 10 is possible.

Next, the user operates the operation switch 5 to be turned on to cause the motor to rotate the tip tool 10, and then brings the tip tool 10 into abutment with a cutting position of the workpiece. This enables cutting of the workpiece using the tip tool 10.

When the tip tool 10 for cutting is brought into abutment with the workpiece, the grinder 2 is sometimes kicked back from the workpiece due to a reaction force applied from the workpiece to the tip tool 10.

When kicking back (kickback) occurs, the grinder 2, more particularly the gear housing 6 to which the tip tool 10 is attached, moves greatly. Then, this movement causes an acceleration in an arc direction about the spindle 12 to be applied to the weight 52 of the movable member 50, and the weight 52 moves from the initial position.

Figure 6:
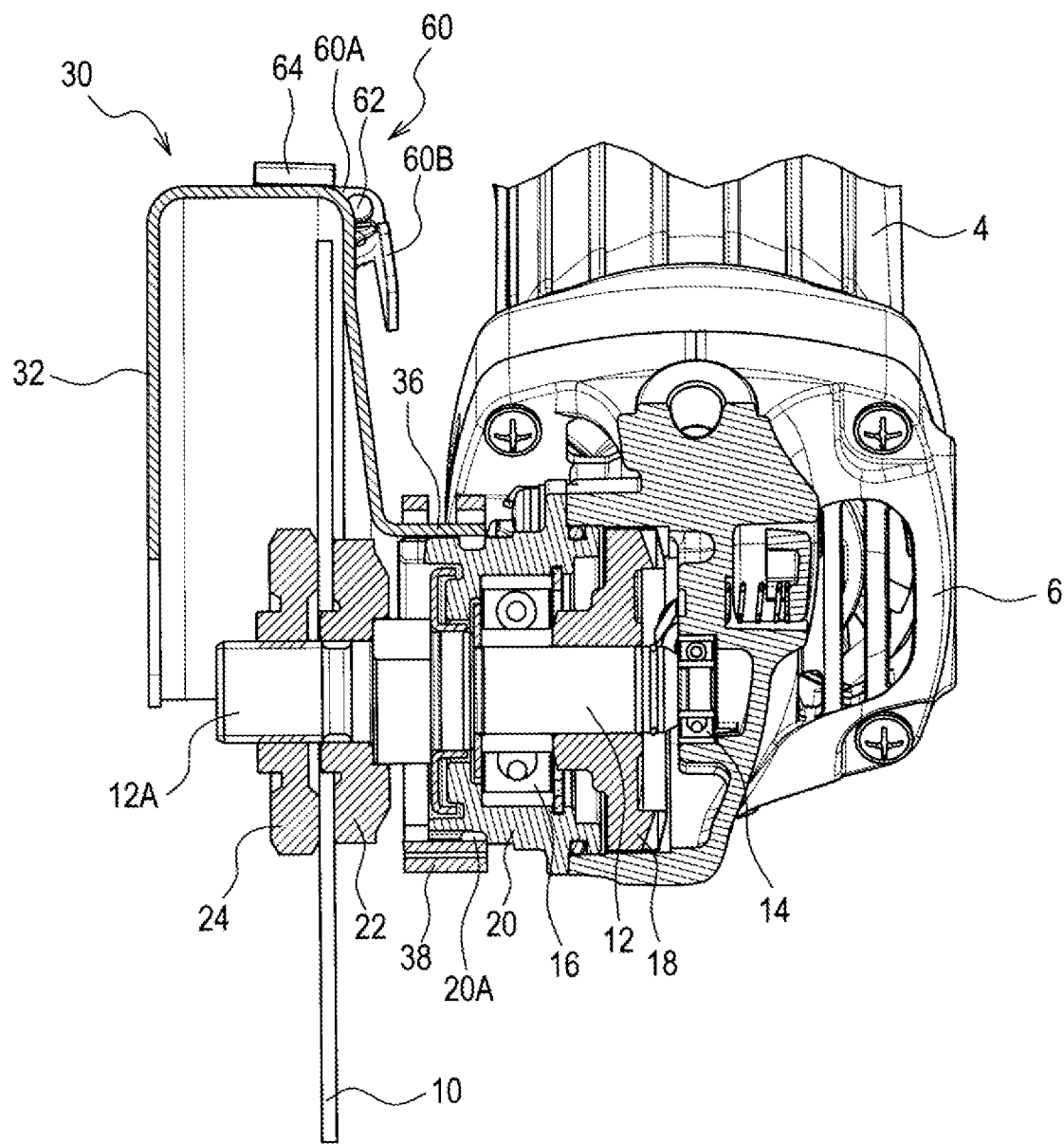
FIG. 6 is a sectional view showing the surroundings of the gear housing while the auxiliary cover is in the protecting position.

Once the weight 52 moves from the initial position as described above, the movable member 50 is no longer located between the cover main body 32 and the piece 60B of the engaging member 60 as shown in FIG. 6; thus, the engaging member 60 pivots about the support shaft 62, and engagement between the projection 35 and the claw 64 is released.

Figure 5:
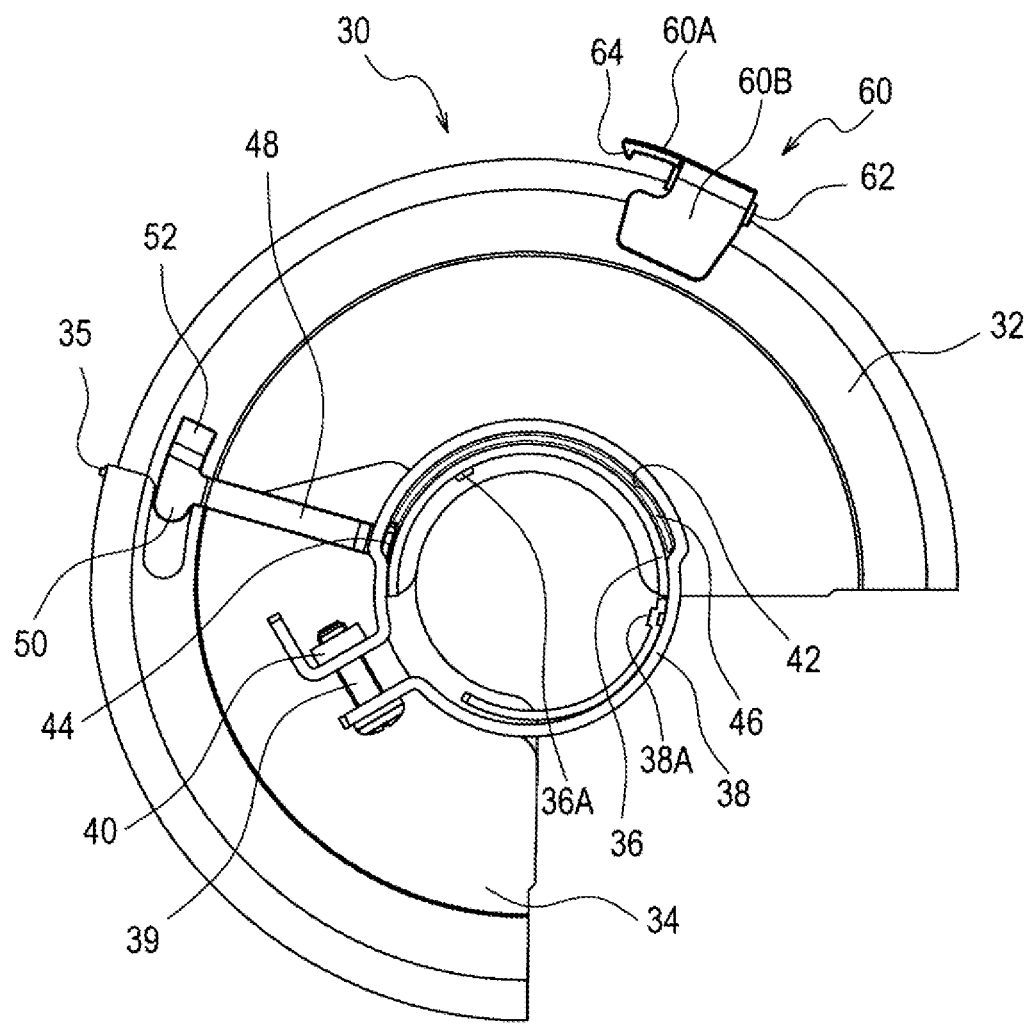
FIG. 5 is a plan view showing the protection cover while the auxiliary cover is in a protecting position.

Thus, if kickback occurs during processing of a workpiece, the biasing force of the tension spring 46 as a biasing member causes the auxiliary cover 34 to be displaced together with the movable member 50 from the processing position shown in FIG. 3 to the protecting position shown in FIG. 5.

Figure 7:
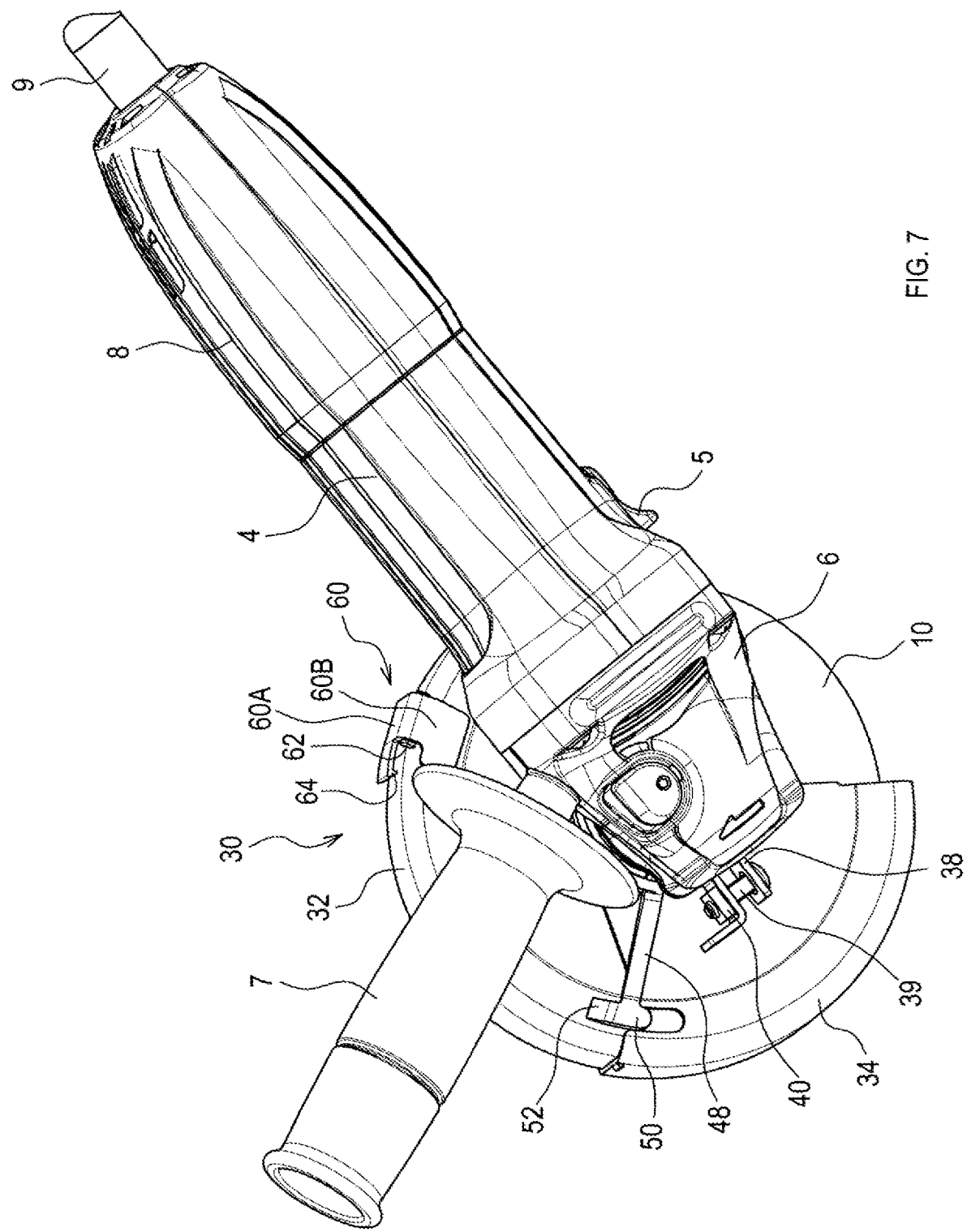
FIG. 7 is a perspective view showing an entire configuration of the grinder while the auxiliary cover is in the protecting position.

Accordingly, as shown in FIG. 7, the open area of the tip tool 10 (in other words, the processing area of the workpiece), which cannot be covered only by the cover main body 32, can be automatically covered by the auxiliary cover 34 at occurrence of kickback.

According to the grinder 2 of the present embodiment, therefore, it is possible at occurrence of kickback to reduce hitting of a workpiece or surrounding members by the tip tool 10 and resulting damages on these or breakage of the tip tool 10.

Embodiment 2

Next, as a second embodiment of the present disclosure, a description will be given of a protection cover 30A to be attached to the grinder 2 similar to that in the above-described embodiment.

Figure 8:
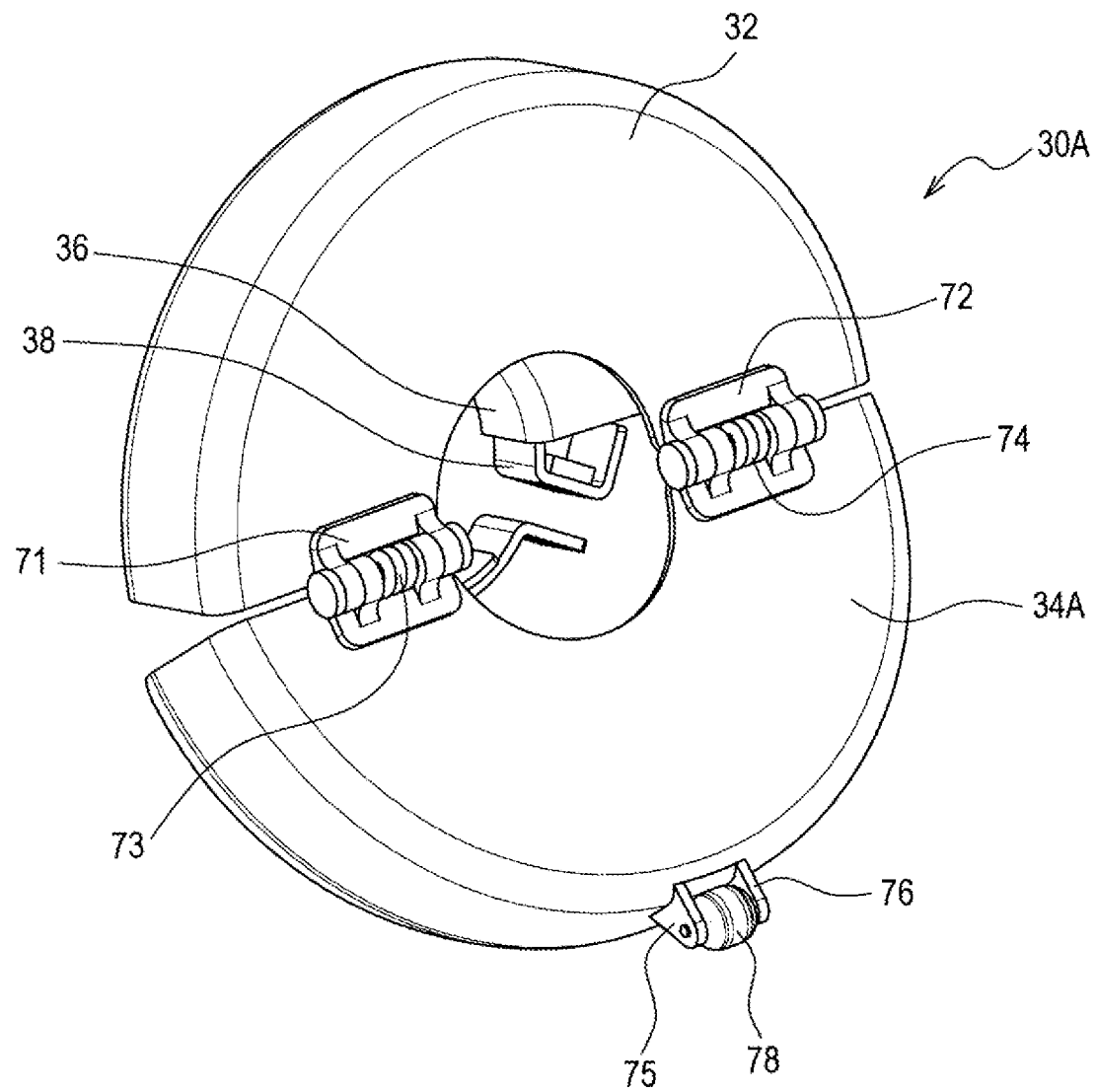
FIG. 8 is a perspective view showing an entire configuration of a protection cover in a second embodiment.

As shown in FIG. 8, the protection cover 30A of the present embodiment includes the cover main body 32 having the attachment portion 36 attachable to the gear housing 6 (more specifically the inner housing 20) of the grinder 2 through the fastening member 38 in a similar manner as in the above-described embodiment, and an auxiliary cover 34A.

The auxiliary cover 34A has a semicircular shape similar to that of the cover main body 32 so as to cover substantially the entire open area of the tip tool 10 (in other words, the processing area of the workpiece), which cannot be covered by the cover main body 32. The auxiliary cover 34A is attached to an opposite plate surface of the cover main body 32 relative to the gear housing 6 through a pair of hinges 71, 72.

The hinges 71, 72 are arranged at an open end side of the cover main body 32, from which the tip tool 10 extends, and apart from each other by a specified distance such that a central portion of the cover main body 32 facing the top end of the spindle 12, to which the tip tool 10 is attached, is located between the hinges 71, 72. The auxiliary cover 34A is fixed to be able to open and close an open end of the cover main body 32 through the hinges 71, 72.

Thus, when the cover main body 32 is attached to the gear housing 6, the auxiliary cover 34A can be moved toward and away from the tip tool 10 by pivoting about rotation shafts of the hinges 71, 72. The auxiliary cover 34A is open on a side facing the gear housing 6 so as not to contact the tip tool 10 when the auxiliary cover 34A is moved close to the tip tool 10 to cover the open area of the tip tool 10.

The rotation shafts of the hinges 71, 72 are provided with respective torsion springs 73, 74 that bias the auxiliary cover 34A in a direction of the protecting position to cover the tip tool 10. Accordingly, as shown in FIG. 9, the auxiliary cover 34A is usually brought into abutment with the open end of the cover main body 32 by biasing forces of the torsion springs 73, 74, which are biasing members, thereby being arranged in the protecting position to cover the open area of the tip tool 10.

To perform cutting operation of a workpiece with the protection cover 30A configured as described above attached to the grinder 2, an opposite end of the auxiliary cover 34A relative to the cover main body 32 is brought into abutment with the workpiece, thereby pivoting the auxiliary cover 34A to the processing position that allows cutting of the workpiece.

In this regard, such pivoting of the auxiliary cover 34A requires sliding of an abutting portion of the auxiliary cover 34A against the workpiece. There may be cases where sliding is difficult due to a shape of the outer peripheral edge of the auxiliary cover 34A, and the auxiliary cover 34A requires pivoting by hand.

Figure 9:
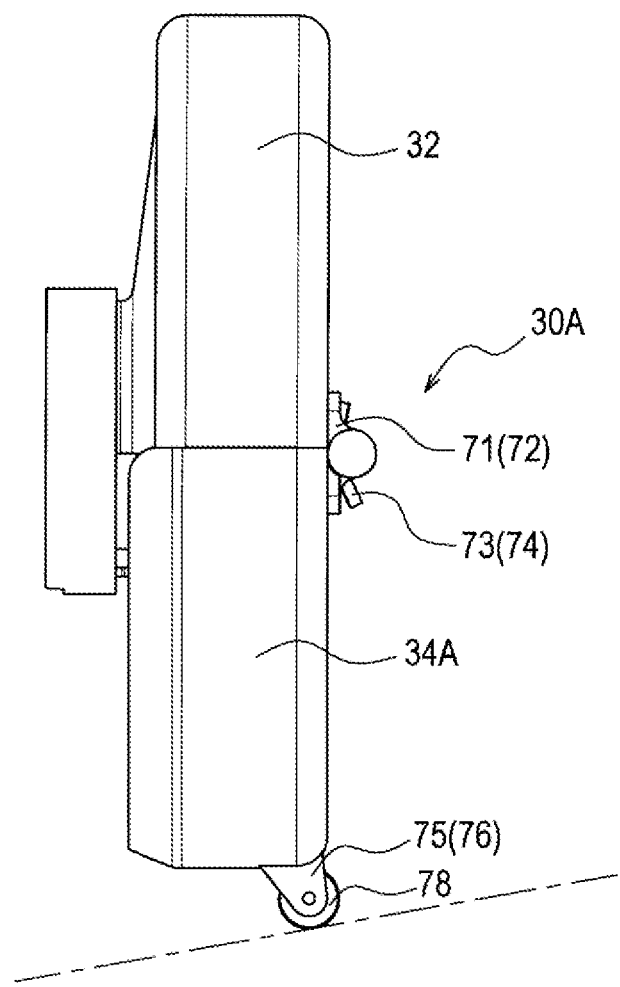
FIG. 9 is a side elevational view showing the protection cover while an auxiliary cover is in a protecting position.

Thus, in the present embodiment, a roller 78 is provided to an opposite end of the auxiliary cover 34A relative to the cover main body 32, and the roller 78 can be abutted on the workpiece, which is indicated by a one-dot chain line, as shown in FIG. 9, during performance of the cutting operation of the workpiece.

Also, the roller 78 includes a rotation shaft having both ends rotatably supported by two support portions 75, 76 that are provided extending apart from each other and along the outer peripheral edge of the auxiliary cover 34A at the opposite end of the auxiliary cover 34A relative to the cover main body 32.

Figure 10:
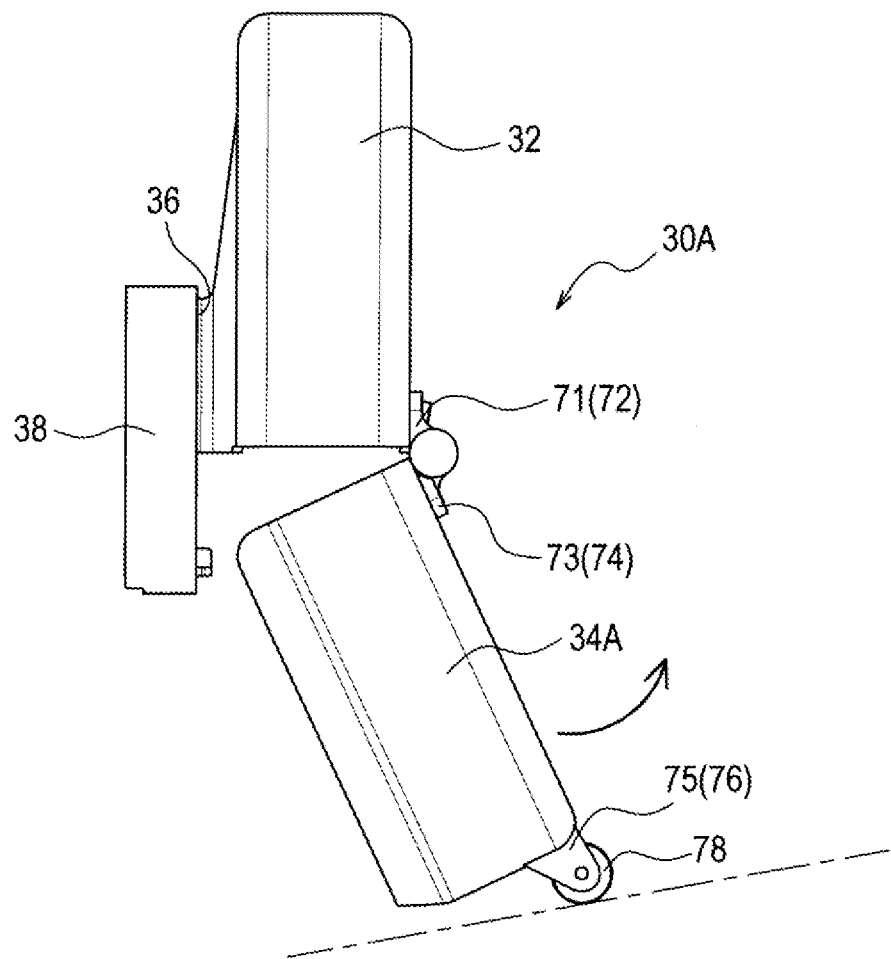
FIG. 10 is a side elevational view showing a state where the auxiliary cover is being displaced to a processing position during cutting of a workpiece.

Thus, during cutting of a workpiece, a user abuts the roller 78 against the workpiece and presses the grinder 2 to the workpiece, thereby allowing displacement of the auxiliary cover 34A from the protecting position to the processing position as indicated by an arrow in FIG. 10.

If kickback occurs during cutting of the workpiece, and the grinder 2 is kicked back from the workpiece, the auxiliary cover 34A is returned to the protecting position shown in FIG. 9 by biasing forces of the torsion springs 73, 74.

Accordingly, when the protection cover 30A of the present embodiment is provided to the grinder 2, the open area of the tip tool 10 can be automatically covered with the auxiliary cover 34A upon occurrence of kickback, and similar effects as in the above-described embodiment can be obtained.

Also, the protection cover 30A of the present embodiment need not be provided with the movable member 50 to detect kickback or the engaging member 60 to position the auxiliary cover 34 in the processing position, in order to move the auxiliary cover 34A to the protecting position upon occurrence of kickback as in the above-described embodiment.

Accordingly, the present embodiment can achieve a simple configuration of the protection cover 30A as compared with the above-described embodiment.

Figure 11:
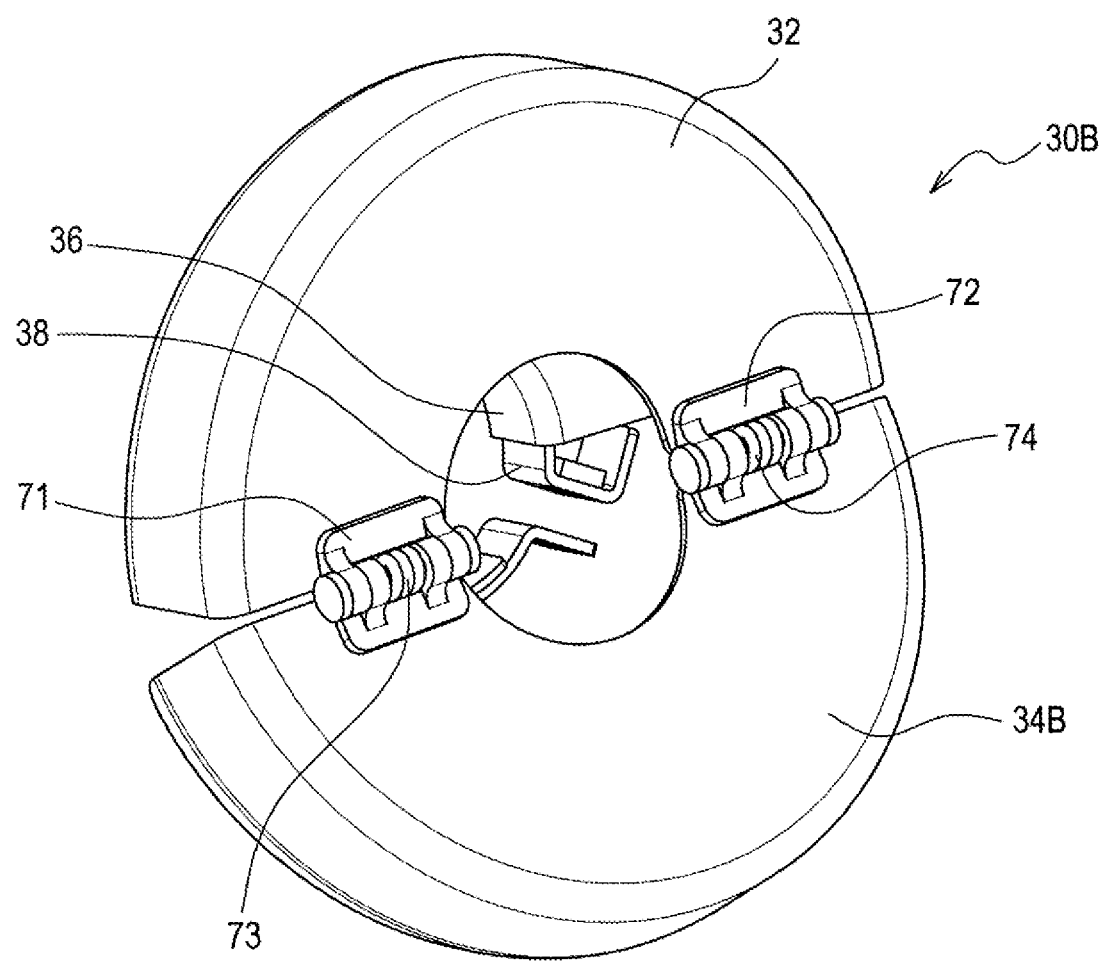
FIG. 11 is a perspective view showing a modified example of the protection cover of the second embodiment.

The auxiliary cover 34A does not necessarily require the roller 78, and as shown in FIG. 11, a protection cover 30B may be configured using an auxiliary cover 34B without the roller 78. In this case, the auxiliary cover 34B does not require the support portions 75, 76 to support the roller 78, leading to a simpler configuration of the protection cover 30B.

Embodiment 3

Next, as a third embodiment of the present disclosure, a description will be given of a protection cover 30C to be attached to the grinder 2 similar to that in the above-described embodiments.

Figure 12:
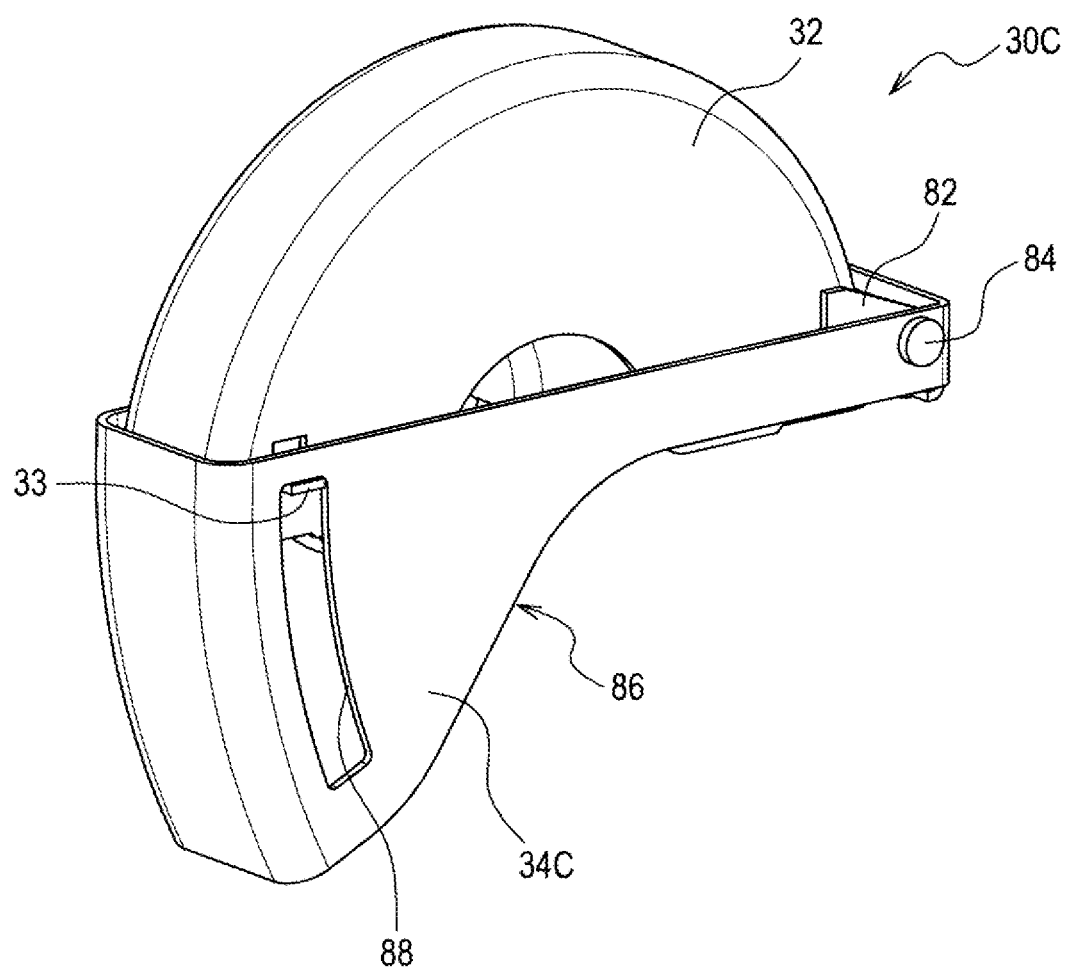
FIG. 12 is a perspective view showing an entire configuration of a protection cover in a third embodiment.

As shown in FIG. 12, the protection cover 30C of the present embodiment includes the semicircular shaped cover main body 32 configured in a similar manner as in each of the above-described embodiments, and an auxiliary cover 34C.

The auxiliary cover 34C is pivotably attached to the cover main body 32 through a pivot shaft 84 provided at one end of an outer frame portion of the cover main body 32 that surrounds the outer peripheral edge of the tip tool 10.

The pivot shaft 84 is supported by a pair of support pieces 82 (one of the support pieces is shown in the figure) extending from plate surfaces of the cover main body 32, which face front and reverse surfaces of the tip tool 10, such that the pivot shaft 84 is parallel to the spindle 12 when the protection cover 30C is attached to the grinder 2.

Figure 13:
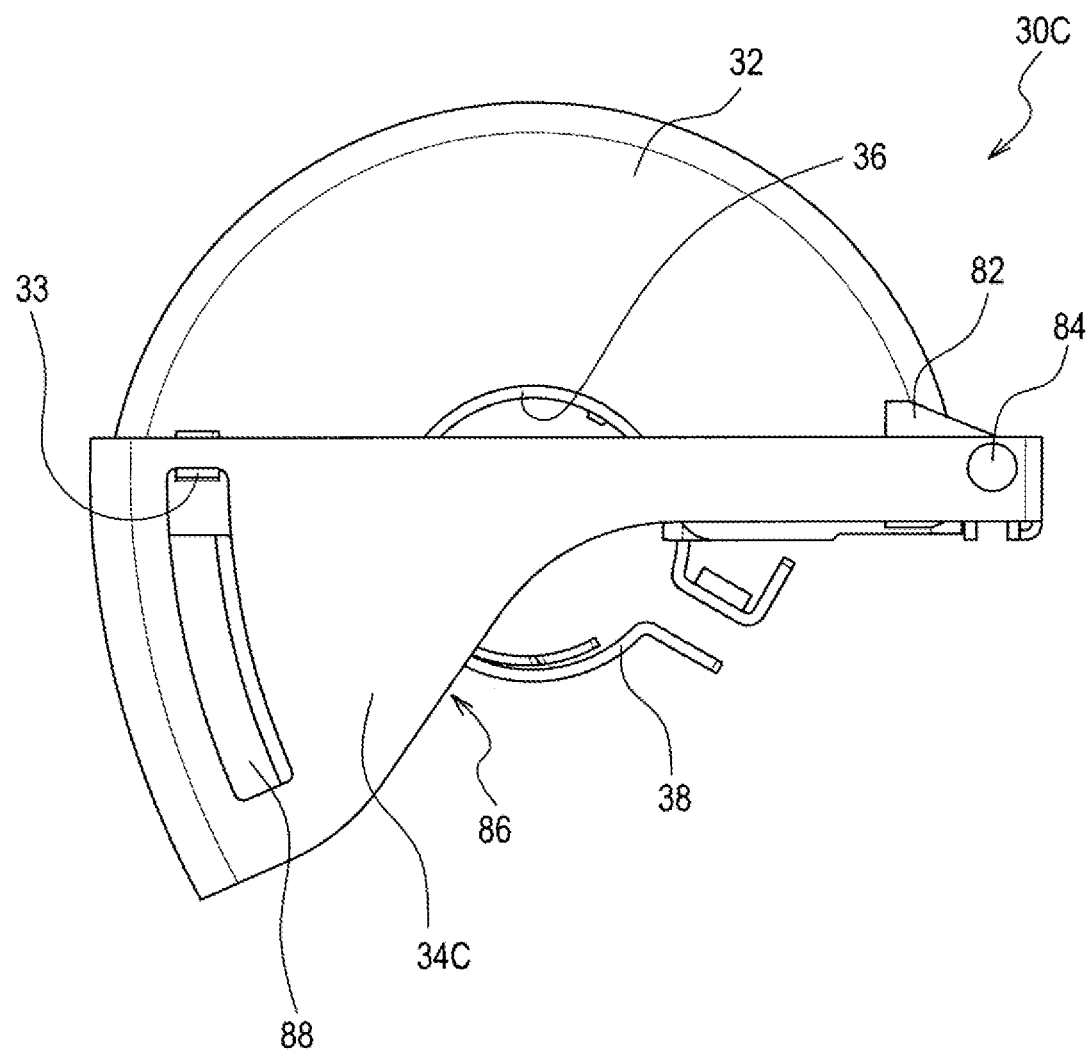
FIG. 13 is a plan view showing the protection cover while an auxiliary cover is in a protecting position.

Also, the pivot shaft 84 includes a torsion spring (not shown) to bias an opposite end of the auxiliary cover 34C relative to the pivot shaft 84 in a direction of extending from an open end of the cover main body 32, thereby arranging the auxiliary cover 34C in a protecting position shown in FIG. 13.

The auxiliary cover 34C is configured, while being arranged in the protecting position, to surround the cover main body 32 in an area from the pivot shaft 84 via the central portion facing the top end of the spindle 12 to the other end of the outer frame portion of the cover main body 32.

Also, a plate surface of the auxiliary cover 34C facing the tip tool 10 opposite to the gear housing 6 has a greater width on an opposite side of the central portion relative to the pivot shaft 84 as compared with a width on a side of the pivot shaft 84.

This is to allow the auxiliary cover 34C, while being arranged in the protecting position, to cover the outer periphery of the tip tool 10 extending from the cover main body 32 using the wide plate surface and an outer frame facing the outer peripheral edge of the tip tool 10.

In the wide part of the auxiliary cover 34C, an end edge 86 of the plate surface extending from the cover main body 32 to cover the tip tool 10 has a curved shape. This is to allow abutment of a workpiece during cutting of the workpiece, to thereby smoothly move the auxiliary cover 34C toward the cover main body 32 against the biasing force of the torsion spring.

Figure 14:
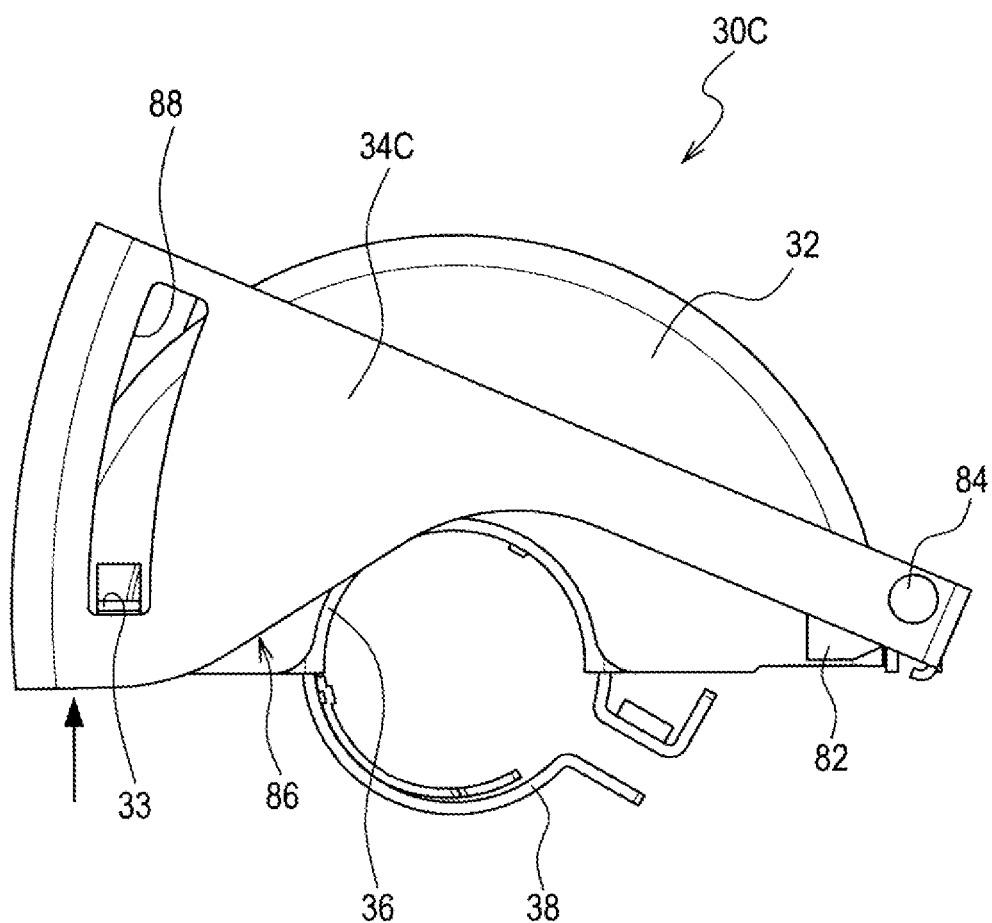
FIG. 14 is a plan view showing the protection cover while the auxiliary cover is in a processing position.

Further, the cover main body 32 and the auxiliary cover 34C include respective restricting portions 33, 88 to position the auxiliary cover 34C in the protecting position, and to displace the auxiliary cover 34C from the protecting position to a retreat position shown in FIG. 14.

In the retreat position shown in FIG. 14, substantially an entire area of the wide part of the auxiliary cover 34C to cover the tip tool 10 is moved to the cover main body 32, and a given position from the protecting position to the retreat position may be the processing position of a workpiece in the present embodiment.

The restricting portion 33 of the cover main body 32 is configured with a projecting piece that projects from the plate surface of the cover main body 32 in a vicinity of its open end. The restricting portion 88 of the auxiliary cover 34C is configured with an arc-shaped elongated opening, in which the restricting portion 33 (that is, the projecting piece) of the cover main body 32 is placed, and which is abutted by the restricting portion 33 at the protecting position or the processing position to thereby restrict a pivot range of the auxiliary cover 34C about the pivot shaft 84.

According to the protection cover 30C configured as described above, similarly to the protection cover 30A of the second embodiment, the auxiliary cover 34C is usually arranged in the protecting position to protect the tip tool 10 by the biasing force of the torsion spring. During performing cutting operation of a workpiece, the workpiece is brought into abutment with the auxiliary cover 34C, thereby enabling movement of the auxiliary cover 34C to a desired processing position.

If kickback occurs during cutting of a workpiece and the grinder 2 is kicked back from the workpiece, the auxiliary cover 34C is returned to the protecting position shown in FIG. 13 by the biasing force of the torsion spring provided to the pivot shaft 84.

Accordingly, also in the case of providing the protection cover 30C of the present embodiment to the grinder 2, an open area of the tip tool 10 can be covered automatically with the auxiliary cover 34C when kickback occurs, and the similar effect as in the above-described embodiments can be obtained.

Although some embodiments of the present disclosure have been described above, the working machine of the present disclosure is not limited to the above-described embodiments but may be in various forms.

For example, in the second and third embodiments, examples have been described in which the auxiliary covers 34A to 34C are each usually arranged in the protecting position by the biasing force of the torsion spring; however, a movable member and an engaging member may be provided as in the first embodiment, to enable retention in a specified retreat position.

This saves the need to bring a workpiece into abutment with each of the auxiliary covers 34A to 34C during cutting of the workpiece to thereby move the auxiliary cover to a desired processing position, and thus provides an improved operability during cutting.

Also, in the aforementioned embodiments, examples have been described in which the protection covers 30, 30A, 30B, and 30C are configured with the cover main body 32 and the respective auxiliary covers 34, 34A, 34B, and 34C. However, the protection cover may be configured to cover an entire or a substantially entire area of the tip tool 10, and the entire protection cover may be moved between the protecting position and the processing position.

Further, the working machine of the present disclosure has been described taking the grinder 2 as an example in the aforementioned embodiments. However, the present disclosure may be applied to any device that drives a tip tool (for example, a cutting blade) to cut a workpiece by rotation of an output shaft, and the device may be, for example, a circular saw.

In the aforementioned embodiments, an electric grinder (in other words, an electric working machine) that drives an output shaft by a motor has been described. However, the present disclosure may be applied to a working machine that drives an output shaft by compressed air or an internal combustion engine, in the same manner as in the aforementioned embodiments.

A plurality of functions performed by a single element in the aforementioned embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the aforementioned embodiments may be omitted. Moreover, at least a part of a configuration in the aforementioned embodiments may be added to, or may replace, another configuration in the aforementioned embodiments. Any form included in the technical idea defined only by the language of the claims may be an embodiment of the present disclosure.

The invention claimed is:

1. A working machine comprising:
an output shaft to which a tip tool to cut a workpiece is attachable;
a housing rotatably supporting the output shaft;
a protection cover attached to the housing so as to cover an outer periphery of the tip tool which is attached to the output shaft, the protection cover being configured to be displaceable between a processing position to expose a part of the outer periphery of the tip tool to thereby allow cutting of the workpiece, and a protecting position to cover the outer periphery of the tip tool more than in the processing position;
a biasing member biasing the protection cover to be displaced from the processing position to the protecting position;
a movable member configured to move from an initial position in response to a reaction force applied from the workpiece to the tip tool during cutting of the workpiece; and
an engaging member configured to directly engage the protection cover and hold the protection cover in the processing position while the movable member is in the initial position, and to disengage from the protection cover and allow the biasing member to displace the protection cover to the protecting position in response to a movement of the movable member from the initial position.

2. The working machine according to claim 1, wherein the movable member includes a weight configured to move from the initial position in response to a movement of the working machine in a specified direction at an acceleration equal to or greater than a specified value.

3. The working machine according to claim 1,
wherein the protection cover includes a cover main body to cover the tip tool so as to expose a part of the outer periphery of the tip tool, and an auxiliary cover to cover the outer periphery of the tip tool exposed from the cover main body, and
wherein the biasing member is configured to bias the auxiliary cover to cause the auxiliary cover to cover the outer periphery of the tip tool in the protecting position.

4. The working machine according to claim 3,
wherein the auxiliary cover is provided pivotably about the output shaft, and
wherein the biasing member is configured to bias the auxiliary cover about the output shaft such that the auxiliary cover covers the outer periphery of the tip tool in the protecting position.

5. The working machine according to claim 3,
wherein the auxiliary cover is provided pivotably about a pivot shaft which is different from the output shaft, and
wherein the biasing member is configured to bias the auxiliary cover about the pivot shaft such that the auxiliary cover covers the outer periphery of the tip tool in the protecting position.

6. The working machine according to claim 5, wherein the auxiliary cover is provided to the cover main body.

7. The working machine according to claim 6,
wherein the pivot shaft is provided to an outer frame portion of the cover main body surrounding an outer peripheral edge of the tip tool so as to be parallel to the output shaft, and
wherein at least one of the cover main body or the auxiliary cover includes a restricting portion to restrict a pivot region in which the auxiliary cover is pivotable about the pivot shaft.

8. A working machine comprising:
an output shaft to which a tip tool to cut a workpiece is attachable;
a housing rotatably supporting the output shaft;
a protection cover attached to the housing so as to cover an outer periphery of the tip tool which is attached to the output shaft, the protection cover being configured to be displaceable between a processing position to expose a part of the outer periphery of the tip tool to thereby allow cutting of the workpiece, and a protecting position to cover the outer periphery of the tip tool more than in the processing position;
a biasing member biasing the protection cover to be displaced from the processing position to the protecting position;
a movable member configured to move from an initial position in response to an attitude change of the working machine caused by a reaction force applied from the workpiece to the tip tool during cutting of the workpiece; and
an engaging member configured to engage with the protection cover and hold the protection cover in the processing position while the movable member is in the initial position, and to disengage from the protection cover and cause the biasing member to displace the protection cover to the protecting position in response to a movement of the movable member from the initial position,
wherein the movable member includes a weight configured to move from the initial position in response to a movement of the working machine in a specified direction at an acceleration equal to or greater than a specified value.

9. The working machine according to claim 8,
wherein the protection cover includes a cover main body to cover the tip tool so as to expose a part of the outer periphery of the tip tool, and an auxiliary cover to cover the outer periphery of the tip tool exposed from the cover main body, and
wherein the biasing member is configured to bias the auxiliary cover to cause the auxiliary cover to cover the outer periphery of the tip tool in the protecting position.

* * * * *